(12) United States Patent
Ducellier et al.

(10) Patent No.: US 7,039,267 B2
(45) Date of Patent: May 2, 2006

(54) OPTICAL SWITCH

(75) Inventors: Thomas Ducellier, Ottawa (CA); Ian Powell, Ottawa (CA); Stephen David Shaw, Carp (CA)

(73) Assignee: JDS Uniphase Inc., Ottawa (CA)

( * ) Notice: Subject to any disclaimer, the term of this patent is extended or adjusted under 35 U.S.C. 154(b) by 155 days.

(21) Appl. No.: 10/766,878

(22) Filed: Jan. 30, 2004

(65) Prior Publication Data
US 2004/0184716 A1    Sep. 23, 2004

Related U.S. Application Data

(63) Continuation-in-part of application No. 09/988,538, filed on Nov. 20, 2001, now abandoned.

(30) Foreign Application Priority Data

| Nov. 20, 2000 | (CA) | ................................. 2326362 |
| Dec. 6, 2000 | (CA) | ................................. 2327862 |
| Dec. 19, 2000 | (CA) | ................................. 2328759 |

(51) Int. Cl.
*G02B 6/35* (2006.01)

(52) U.S. Cl. .......................................... 385/17; 385/18
(58) Field of Classification Search ............. 385/16–18
See application file for complete search history.

(56) References Cited

U.S. PATENT DOCUMENTS

| 4,516,837 A * | 5/1985 | Soref et al. ................. 349/196 |
| 5,345,321 A * | 9/1994 | DeJule et al. .................... 349/5 |
| 5,524,153 A | 6/1996 | Laor ............................ 385/16 |
| 5,914,801 A | 6/1999 | Dhuler et al. ................ 359/230 |
| 6,002,818 A | 12/1999 | Fatehi et al. ................... 385/17 |
| 6,005,993 A * | 12/1999 | MacDonald .................. 385/16 |
| 6,005,998 A | 12/1999 | Lee .............................. 385/33 |
| 6,087,747 A | 7/2000 | Dhuler et al. ................. 310/90 |
| 6,097,858 A | 8/2000 | Laor ........................... 385/16 |
| 6,097,859 A * | 8/2000 | Solgaard et al. .............. 385/17 |
| 6,097,860 A * | 8/2000 | Laor ........................... 385/17 |
| 6,101,299 A | 8/2000 | Laor ........................... 385/16 |
| 6,134,042 A | 10/2000 | Dhuler et al. ................ 359/224 |
| 6,253,001 B1 | 6/2001 | Hoen .......................... 385/17 |
| 6,289,145 B1 | 9/2001 | Solgaard et al. .............. 385/17 |
| 6,330,102 B1* | 12/2001 | Daneman et al. ........... 359/290 |
| 6,337,760 B1* | 1/2002 | Huibers et al. ............. 359/291 |

(Continued)

FOREIGN PATENT DOCUMENTS

WO    WO 99/66354    12/1999

*Primary Examiner*—Ellen E. Kim
(74) *Attorney, Agent, or Firm*—Teitelbaum & MacLean; Neil Teitelbaum; Doug MacLean (57) ABSTRACT

The invention provides an optical switch having a pair of opposed optical arrays, each optical array including a fixed mirror and a plurality of independently tiltable mirrors, at least one input port for launching a beam of light into the optical switch, said input port being disposed within a respective optical array, at least two output ports for selectively receiving a beam of light from an optical path between the at least one input port and a selected one of the at least two output ports, said at least two output ports being disposed within a respective opposed optical array, and an ATO element having optical power disposed between the pair of opposed optical arrays. The pair of opposed optical arrays is disposed in respective focal planes of the ATO element. Preferably, the ATO element has a focal length equal to a Rayleigh range of a beam of light incident thereon.

18 Claims, 11 Drawing Sheets

U.S. PATENT DOCUMENTS

| | | | |
|---|---|---|---|
| 6,424,756 B1 * | 7/2002 | Kalman et al. | 385/16 |
| 6,430,328 B1 * | 8/2002 | Culver et al. | 385/16 |
| 6,445,844 B1 | 9/2002 | Neukermans et al. | 385/18 |
| 6,466,711 B1 * | 10/2002 | Laor et al. | 385/18 |
| 6,487,334 B1 | 11/2002 | Ducellier et al. | 385/22 |
| 6,504,967 B1 * | 1/2003 | Zhou et al. | 385/18 |
| 6,522,404 B1 * | 2/2003 | Mikes et al. | 356/328 |
| 6,522,802 B1 * | 2/2003 | Hoen | 385/18 |
| 6,560,000 B1 | 5/2003 | Iyer et al. | 359/238 |
| 6,687,428 B1 * | 2/2004 | Huber et al. | 385/17 |
| 6,795,602 B1 * | 9/2004 | Neukermans et al. | 385/18 |
| 2005/0013534 A1 * | 1/2005 | Kazama et al. | 385/18 |

* cited by examiner

OPTICAL SWITCH

CROSS-REFERENCE TO RELATED APPLICATIONS

This application is a continuation-in-part of U.S. patent application Ser. No. 09/988,538 filed Nov. 20, 2001, now abandoned which claims priority from Canadian Patent Application No. 2,326,362 filed on Nov. 20, 2000, Canadian Patent Application No. 2,327,862 filed on Dec. 6, 2000, and Canadian Patent Application No. 2,328,759 filed on Dec. 19, 2000, which are all incorporated herein by reference.

MICROFICHE APPENDIX

Not Applicable

FIELD OF THE INVENTION

The present invention relates to the field of optical switches.

BACKGROUND OF THE INVENTION

Optical matrix switches are commonly used in communications systems for transmitting voice, video and data signals. Generally, optical matrix switches include multiple input and output ports, and have the ability to connect, for purposes of signal transfer, any input port to any output port. Preferably, for N×M switching applications, optical matrix switches also enable multiple connections at one time. At each port, optical signals are transmitted and/or received via an end of an optical waveguide. The waveguide ends of the input and output ports are optically connected across a switch core. In this regard, for example, the input and output waveguide ends can be physically located on opposite sides of a switch core for direct or folded optical pathway communication therebetween, in side-by-side matrices on the same physical side of a switch interface facing a mirror, or they can be interspersed in a single matrix arrangement facing a mirror.

Establishing a connection between an input port and a selected output port, involves configuring an optical pathway across the switch core between the input ports and the output ports. One known way to configure the optical path is by moving or bending optical fibers using, for example, piezoelectric actuators. The actuators operate to displace the fiber ends so that signals from the fibers are targeted at one another so as to form the desired optical connection across the switch core. The amount of movement is controlled based on the electrical signal applied to the actuators. Two-dimensional targeting control can be affected by appropriate arrangement of actuators.

Another way of configuring the optical path between an input port and an output port involves the use of one or more moveable mirrors interposed between the input and output ports. In this case, the waveguide ends remain stationary and the mirrors are used to deflect a light beam propagating through the switch core from the input port to effect the desired switching. Microelectromechanical (MEMS) devices, known in the art, have mirrors disposed thereon that provide for two-dimensional targeting to optically connect any input port to any output port. For example, U.S. Pat. No. 5,914,801, entitled "Microelectromechanical Devices Including Rotating Plates And Related Methods", which issued to Dhuler et al. on Jun. 22, 1999; U.S. Pat. No. 6,087,747, entitled "Microelectromechanical Beam For Allowing A Plate To Rotate In Relation To A Frame In A Microelectromechanical Device", which issued to Dhuler et al. on Jul. 11, 2000; and U.S. Pat. No. 6,134,042, entitled "Reflective MEMS Actuator With A Laser", which issued to Dhuler et al. on Oct. 17, 2000, disclose microelectromechanical systems (MEMS) having mirrors disposed thereon that can be controllably moved in two dimensions to effect optical switching.

U.S. Pat. No. 6,097,858, entitled "Sensing Configuration For Fiber Optic Switch Control System", and U.S. Pat. No. 6,097,860, entitled "Compact Optical Matrix Switch With Fixed Location Fibers", both of which issued to Laor on Aug. 1, 2000, disclose switch control systems for controlling the position of two-dimensionally movable mirrors in an optical switch. The mirrors can allow for two-dimensional targeting to optically connect any of the input fibers to any of the output fibers.

An important consideration in optical switch design is minimizing physical size for a given number of input and output ports that are serviced, i.e. increasing the packing density of ports and beam directing units. It has been recognized that greater packing density can be achieved, particularly in the case of a movable mirror-based beam-directing unit, by folding the optical path between the ports and the movable mirror and/or between the movable mirror and the switch interface. Such a compact optical matrix switch is disclosed in U.S. Pat. No. 6,097,860. In addition, further compactness advantages are achieved therein by positioning control signal sources outside of the fiber array and, preferably, at positions within the folded optical path selected to reduce the required size of the optics path.

Another example of a compact optical switch is disclosed by Laor in WO 99/66354, entitled "Planar Array Optical Switch and Method". The optical switch disclosed therein includes two arrays of reflectors and a plurality of input and output fibers associated with a respective reflector on one of the arrays. The optical signal is directed along a "Z-shape" optical path from the input fibers via the first array of reflector and the second array of reflector to the output fibers.

However, the design of these prior art optical switches is such that the optical components are arranged along the optical path in a "Z-shape" pattern. A "Z-shape" arrangement of optical components is not spatially efficient. Furthermore, the number of input and output ports would determine the physical size of the optical switch. A plurality of input/output locations is provided so that the input and output beams can enter/exit the switching core. These input/output locations are commonly provided in the form of rectangular or other arrays.

Figure 1:
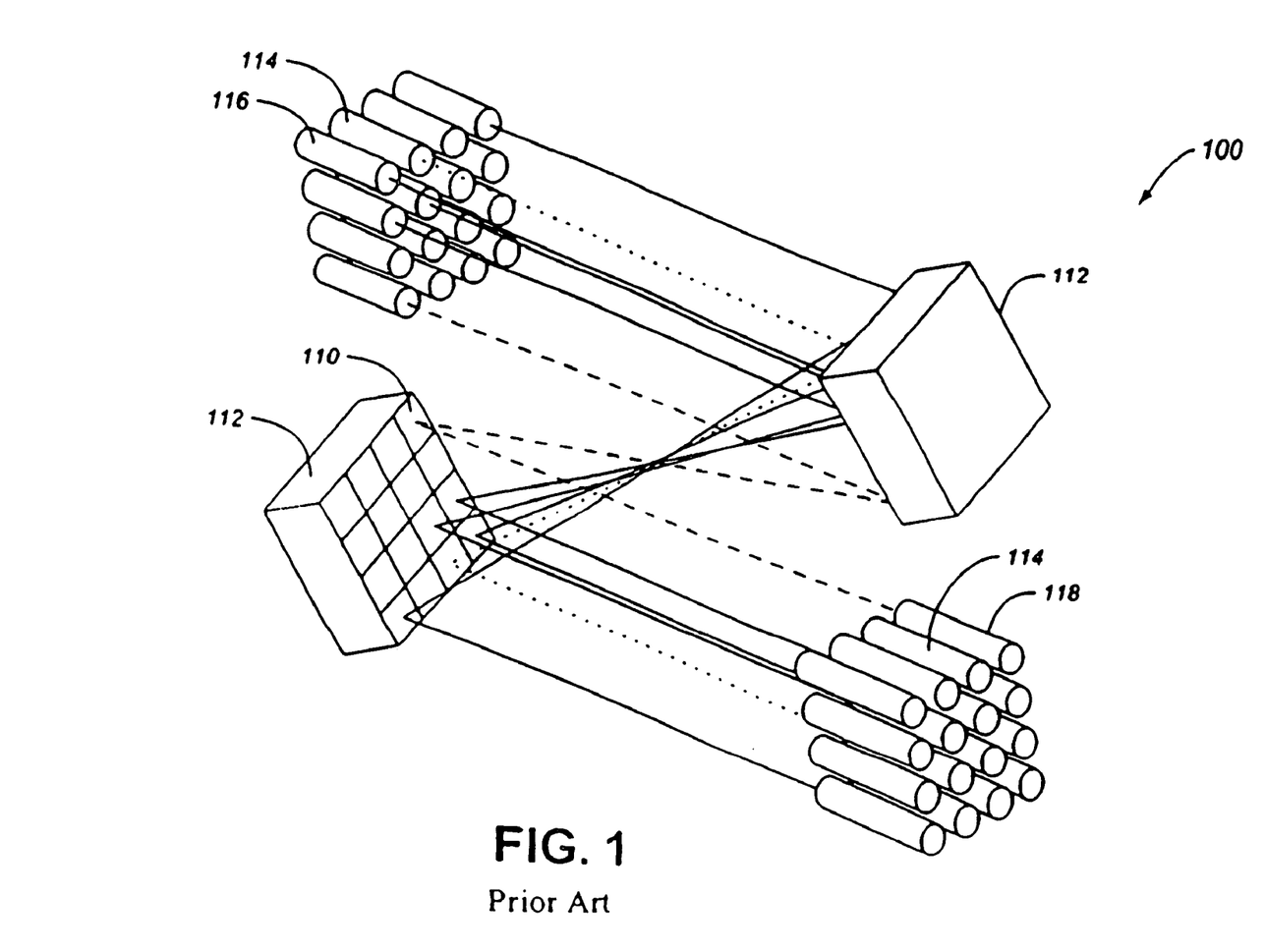
FIG. 1 is a schematic presentation of a prior art optical switch having a Z-shaped arrangement of optical components.

Referring to FIG. 1, a schematic presentation of a prior art optical switch 100 having a Z-shaped arrangement of optical components is shown. A light beam is launched into an input fiber of input fiber bundle 116 and switched to a selected output fiber of output fiber bundle 118 along a Z-shaped optical path through switch 100, wherein micro-mirrors 110 on MEMS chips 112 are used to fold the design. Such a folded optical pathway configuration allows for a more compact switch design using a movable mirror based beam directing unit. However, the general approach in prior art optical switches is to individually collimate the beam from each input fiber and to direct this beam to its dedicated mirror. This mirror then deflects the beam to any one of the plurality of output mirrors which then redirects the beam, i.e. compensates for the angle, to its dedicated output fiber. As is seen from FIG. 1, this design requires the use of a lens 114 for each individual input fiber of input fiber bundle 116 and each individual output fiber of output fiber bundle 118.

The Z-shape approach for switching an optical signal requires particular consideration with respect to the physical spacing between the optical elements since the beam of light should not be obstructed by any of the optical elements along the optical path through the switch. It is apparent that this is not an efficient design since physical size requirements are not optimized in such an "off-axis" design.

The present invention provides an optical switch having an "on-axis" design, and hence it can provide a more compact optical switch than the prior art. In addition, arranging an angle-to-offset (ATO) element between the deflection elements provides for a re-imaging, and hence a small and low loss optical switch can be provided in accordance with the invention.

Accordingly, it is an object of the invention to provide a compact optical switch.

It is a further object to provide a switch with improved spatial efficiency in order to minimize a physical size of the optical switch for a given number of input/output ports.

Another object of this invention is to provide a compact optical cross-connect arrangement.

Another object of this invention is to provide a compact optical switch based on deflection means in transmission.

SUMMARY OF THE INVENTION

Accordingly the present invention relates to an optical switch comprising:

a pair of opposed optical arrays, each optical array including a fixed mirror and a plurality of independently tiltable mirrors;

at least one input port, disposed within one of the optical arrays, for launching a beam of light towards the fixed mirror in other optical array, which redirects the beam of light for multiple passes between the tiltable mirrors in both optical arrays to the fixed mirror in the one optical array;

at least two output ports, disposed within the other optical array, for selectively receiving the beam of light from the fixed mirror in the one optical array; and an ATO element having optical power disposed between the pair of opposed optical arrays for directing the beam of light passing between the optical arrays.

Another aspect of the present invention relates to an optical switch comprising:

at least one input port for launching a beam of light into the optical switch;

at least two output ports for selectively receiving the beam of light from an optical path between the at least one input port and a selected one of the at least two output ports;

an angle-to-offset (ATO) element having optical power for performing an angle-to-offset transformation, said ATO element being disposed for redirecting the beam of light traveling between the at least one input port and the at least two output ports;

a first plurality of independently tiltable deflectors and a second plurality of independently tiltable deflectors the first and the second plurality of independently tiltable deflectors for switching the beam of light along an optical path via the ATO element; and at least one fixed deflector for receiving the beam of light from each input port via the ATO element, for deflecting the beam of light to one of the first plurality of independently tiltable deflectors via the ATO element, for receiving the beam of light from one of the second plurality of independently tiltable deflectors via the ATO element and for deflecting the beam of light to a selected one of the at least two output ports via the ATO element.

Another aspect of the present invention relates to An optical switch comprising:

at least one input port for launching a beam of light into the optical switch;

at least two output ports for selectively receiving the beam of light;

an angle-to-offset (ATO) element having optical power; and a first array of deflectors and a second array of deflectors for switching the beam of light from the at least one input port to a selected one of the at least two output ports, wherein the switching is performed along an optical path including the first and the second array of deflectors and the ATO element, and wherein the beam of light is redirected five times by the ATO element when switching a beam of light to a selected one of the at least two output ports.

BRIEF DESCRIPTION OF THE DRAWINGS

Exemplary embodiments of the invention will now be described in conjunction with the drawings in which.

DETAILED DESCRIPTION OF THE INVENTION

The present invention develops the optical architecture of large optical cross-connect structures and applies it to medium and small-scale switches to provide a very compact optical switch. For this purpose, two opposing arrays of deflectors, including a plurality of independently and two-dimensionally tiltable micro-mirrors disposed on a MEMS chip, are used in conjunction with an angle-to-offset (ATO) element to provide a switch core in a miniaturized space. The waveguides or fibers are fed through the MEMS chip themselves for compactness, while a single common fixed mirror is added on each opposite MEMS chip for targeting purpose.

Prior art deflection means in transmission are accomplished using a dual mirror arrangement for doubly deflecting the beam. For example, an array of 2 mirrors is used to steer the beam in transmission; a first fixed mirror is used to redirect a beam to a second 2D tiltable mirror that provides the beam steering. Such a dual mirror arrangement is required for each input/output fiber and hence, a clearing is required so as not to obstruct the path of the light beams. In accordance with the present invention, each fixed mirror is replaced with a common fixed mirror placed at the opposed focal planes of the ATO lens. This common fixed mirror is shared for every port. This arrangement obviates a clearance from a fixed mirror to a 2D moveable mirror due to tilting. The optical switch in accordance with the present invention employs two common fixed mirrors, one for the input ports and one for the output ports. Such an arrangement allows to work with normal incidence on mirrors (reduced PDL) and provides a higher fill factor than prior art optical switches. For example, a fill factor of close to 50% is achieved with the switch in accordance with the invention when compared to fill factors of approximately 15–30% for prior art switches using beam steering in transmission.

Figure 2:
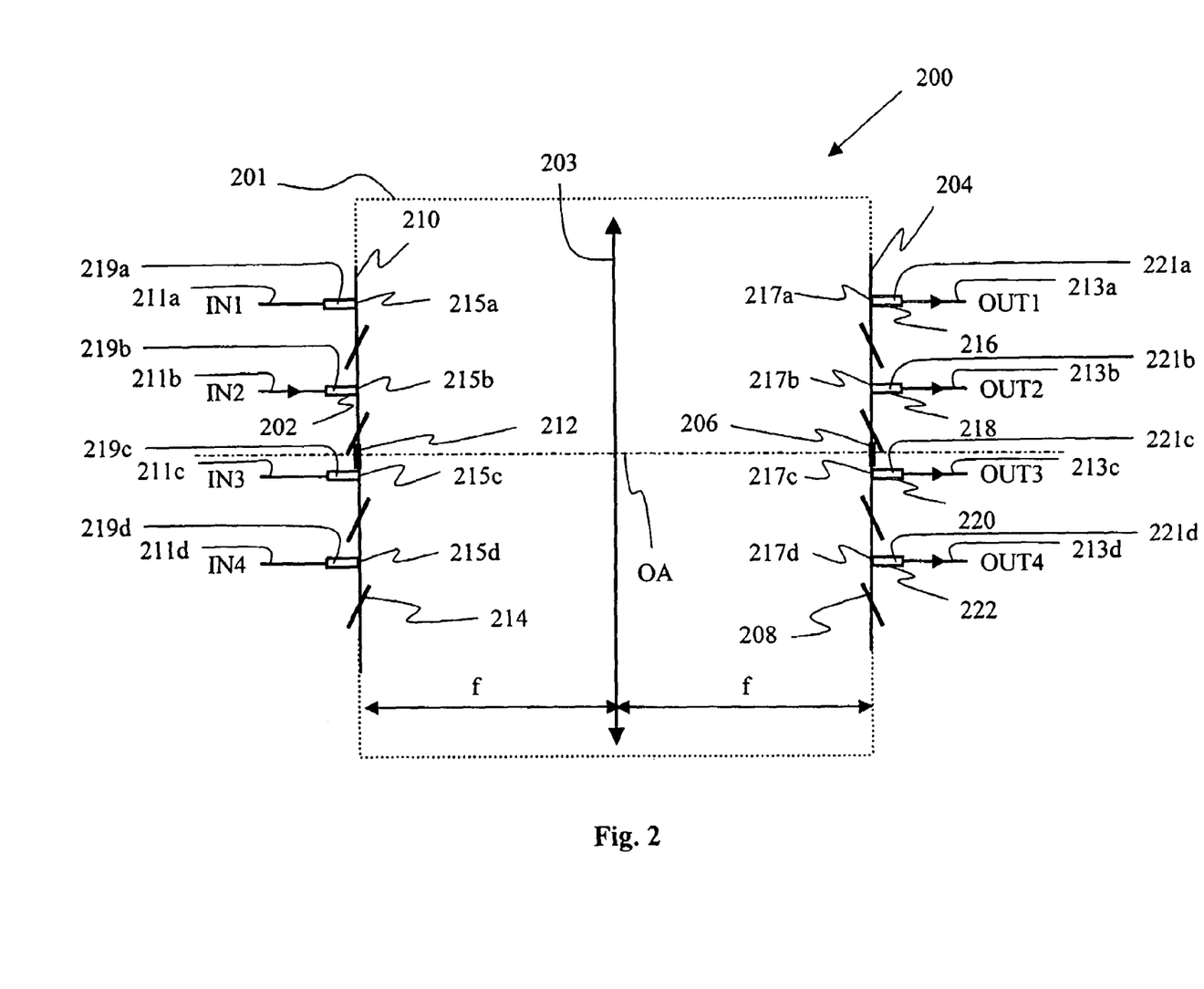
FIG. 2 shows a schematic presentation of an optical switch in accordance with the present invention.

FIG. 2 shows a schematic presentation of an optical switch 200 in accordance with the present invention wherein the optical elements are arranged about an optical axis of an ATO element 203. The provision of ATO element 203 affords an optical switch 200 having reduced aberrations.

Switch 200 includes a switch core 201 defined by a pair of opposed arrays of deflectors 204, 210. The first array of deflectors 204 includes a first fixed deflector 206 and a first plurality of 2D tiltable deflectors 208 disposed on a MEMS chip, and the second array of deflectors 210 includes a second fixed deflector 212 and a second plurality of 2D tiltable deflectors 214 disposed on a MEMS chip. Optical switch 200 further includes a plurality of input and output waveguides 211a–d, 213a–d disposed directly at optical bypasses 215a–d, 217a–d of the second and first arrays 210, 204 of the switch core 201. An exemplary input port 202 is shown on the left of FIG. 2 and a plurality of output ports 216, 218, 220, 222 are presented on the right of FIG. 2. As can be seen from FIG. 2, the input port 202 is disposed at optical bypass 215b of the second array 210 and the output ports 216, 218, 220, 222 are disposed at optical bypasses 217a–d of the first array 204. Advantageously, the input waveguides 211a–d terminate in micro-lenses 219a–d, i.e. collimators, which are centered on the optical axis of the respective waveguides 211a–d. Analogously, the output waveguides 213a–d terminate in micro-lenses 221a–d, e.g. collimators, which are centered on the optical axis of the respective waveguides 213a–d.

However, an individual fiber may function as an input fiber as well as an output fiber depending upon the direction of propagation of an optical signal in a bi-directional communication environment. Accordingly, although this description includes references to input and output fibers for purposes of illustration, it will be understood that each of the fibers may send and/or receive optical signals.

The term optical bypass in this description is used to provide an unobstructed path through the switch core to enable light beams to enter/exit the switch core. This is accomplished by providing an opening that defines a passage through which light beams can pass. Alternatively, each optical bypass can be provided as a region of the switch core structure that is substantially transparent to optical wavelengths of light beams being switched through the optical switch. This latter arrangement can be readily achieved by providing the switch core on a conventional Si and/or $SiO_2$ substrate, which is typically transparent to the wavelengths of interest. In this case, the optical bypass is readily constructed by providing a suitably sized region of the substrate that is unobstructed by the deflectors and/or associated deflector control circuitry, or any other optical element or a window.

An angle-to-offset (ATO) element, such as an ATO lens 203 having a focal length f, is disposed in the center of the switch core 201 between the first and the second arrays 204, 210. The first and the second array of deflectors 204 and 210 can be an array of micro-mirrors tilting in two perpendicular directions and one fixed micro-mirror. Further, the first and second arrays of deflectors 204, 210 are arranged in a focal plane of the ATO lens 203. The ATO lens 203 operates to deflect the propagation path of light beams within the switch core 201. For the purposes of the present invention, an ATO lens 203 can be provided as any suitable optical element having optical power, e.g. a mirror or a lens.

While not essential for the purpose of the present invention, the ATO element preferably has a focal length that substantially corresponds to the near zone length (multi mode) or the Rayleigh range (single mode) of a beam of light propagating through optical switch 200. The use of such ATO element means that the size, i.e. the cross-sectional area, of a beam switched through switch core 201 is substantially the same at the tiltable deflectors 208, 214 and also at the input and output micro-lenses/collimators 219a–d, 221a–d. This feature is advantageous for optimizing coupling of the light beams between the input and output waveguides 211a–d, 213a–d. This minimizes the beam size requirement because the beam size on the two focal planes is equal, thus enabling a compact switch. The ATO principle is described in further detail in Canadian Patent Application No. 2,326,362, the disclosure of which is herein incorporated by reference.

Each MEMS mirror 208, 214 is preferably provided as a two-dimensionally tiltable micro-mirror, which can be selectively oriented, in a manner known in the art, to deflect a light beam received from any mirror and/or bypass of the opposite array 204, 210 to any other mirror and/or bypass of the opposite array 210, 204. In this manner, each MEMS mirror 208, 214 can be selectively positioned to define an optical path between any two mirrors and/or bypasses of the opposite first and second arrays 204, 210. This positioning capability of each MEMS mirror 208, 214 enables highly versatile switching of light beams within the switch core 201.

Figure 3:
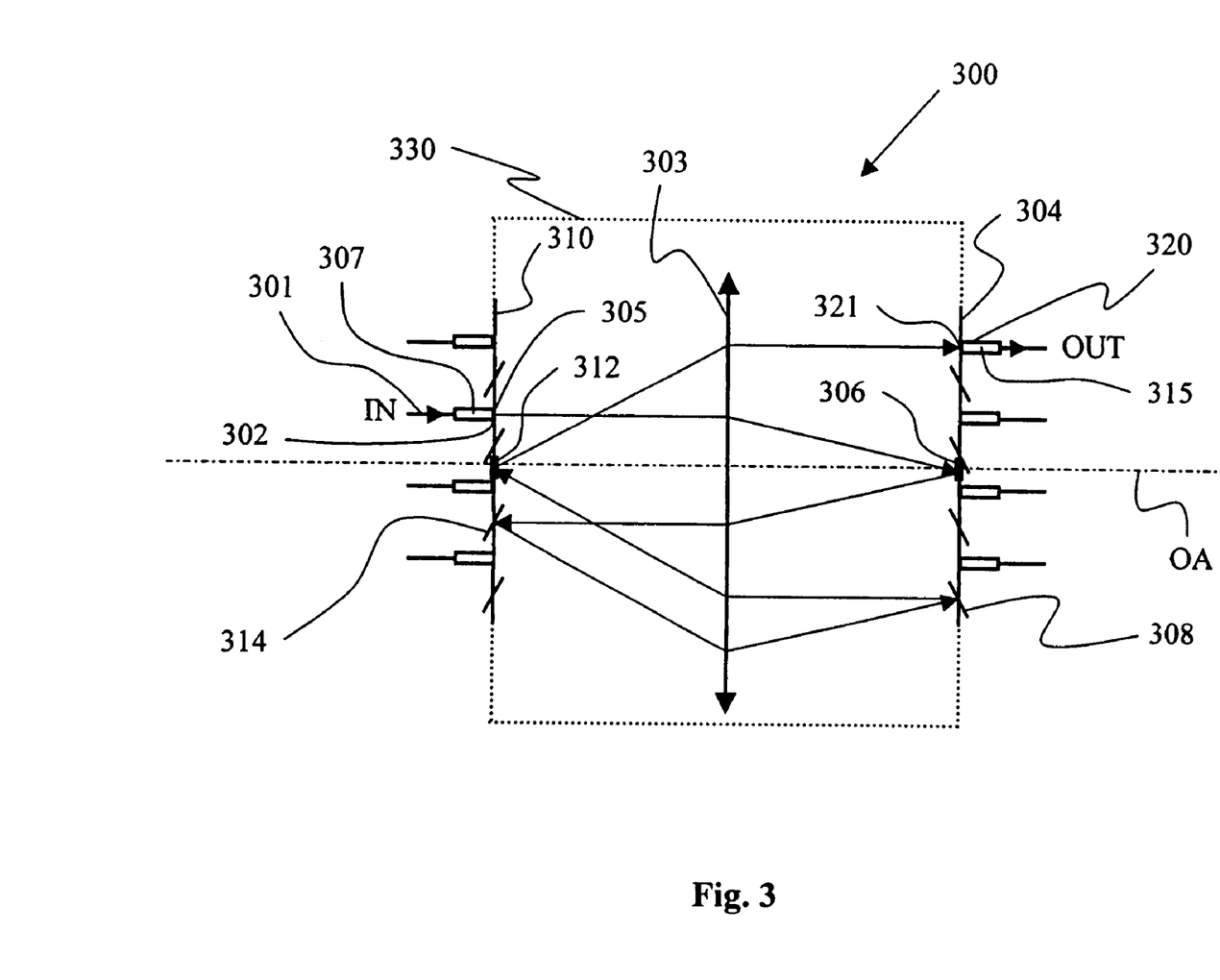
FIG. 3 is a schematic presentation of an exemplary optical path for a beam of light being switched from an input port to a selected output port.

Turning now to FIG. 3, a schematic presentation of an exemplary optical path for a beam of light being switched from an input port 302 to a selected output port 320 is shown, as it travels through switch core 330 of optical switch 300. A beam of light 301 is launched into the optical switch 300 at input port 302. Input port 302 is disposed at optical bypass 305 on a second array of deflectors/MEMS chip 310. As is seen from FIG. 3, a micro-lens 307 is disposed at the input port 302 to serve as a collimator. Beam 301 traverses through an ATO lens 303 and is directed to a first fixed mirror 306, which is arranged on a first array of deflectors/MEMS chip 304. The first fixed mirror 306 then reflects beam 301 to an independently 2D tiltable micro-mirror 314 on MEMS chip 310 by going back through ATO lens 303. As is seen from FIG. 3, beam 301 comes off at an angle when it is deflected by the first fixed mirror 306 and after passing through the ATO lens 303, it is directed parallel to an optical axis OA until beam 301 reaches micro-mirror 314 on array 310. Micro-mirror 314 is tilted to deflect beam 301 to micro-mirror 308 which is disposed on the first MEMS chip 304 by going back through the ATO lens 303. Micro-mirror 308 sends the beam 301 back in parallel to the optical axis by going through ATO lens 303 and then beam 301 collapses onto the second fixed mirror 312 arranged on the second MEMS chip 310. The second fixed mirror 312 distributes beam 301 to output port 320 by going through the ATO lens 303 again. Output port 320 is disposed at optical bypass 321. A micro-lens 315 is disposed at output port 320 to operate as a collimator. It is apparent from FIG. 3 that the ATO lens 303 is used multiple times to switch a light beam from input port 302 to a selected output port 320. In total, beam 301 has passed 5 times through ATO lens 303 so that the ATO lens 303 fulfils the function of a plurality of lenses. For example, the first and the second pass through ATO lens 303 corresponds to a first 1:1 telecentric relay, the third pass through ATO lens 303 corresponds to the ATO switching, and finally, the fourth and fifth pass through ATO lens 303 corresponds to a second 1:1 telecentric relay. This means that the ATO lens 303 fulfils the function of a first telecentric relay, switching, and a second telecentric relay.

By using a same lens multiple times a very compact optical switch is provided. However, in order to accomplish such a compact design, the input and output ports are provided directly on the second and first arrays as described heretofore. The mirrors and the input/output ports share the available space on the first and second arrays, which reduces the fill factor. As a result of the reduced fill factor and a maximum packing density of 50% on the first and second arrays, the present invention is used to provide very compact medium to small-scale switches, such as compact 16×16, 32×32, and/or 64×64 switches. However, the advantage of further using the ATO lens as a relay lens as well as a telecentric relay obviates the use of such telecentric relay lenses which would otherwise take up more space and hence, very compact small to medium scale switches can be made in accordance with the present invention.

However, the present invention is also applicable to large optical switches/cross-connects, but the compactness advantage of having the coupling optics folded into the main switch pass, as opposed to the standard Z-shape approach, starts to be less attractive than getting a higher fill factor.

The input and output ports can consist of optical fibers coupled to collimator lenses as can be seen, for example, from FIGS. 2 and 3. Depending on the material used for making the MEMS chip, the beam of light can be launched directly through a transparent region of the MEMS chip, i.e. a region unobstructed by a micro-mirror, or a passage in form of a hole is provided on the MEMS chip to allow the beam of light to pass therethrough. If silicon or silica are used as a MEMS material, the light can be send directly through the MEMS chip since both silicon and silica are transparent in the infrared region, and in particular at 1.55 microns.

Figure 4:
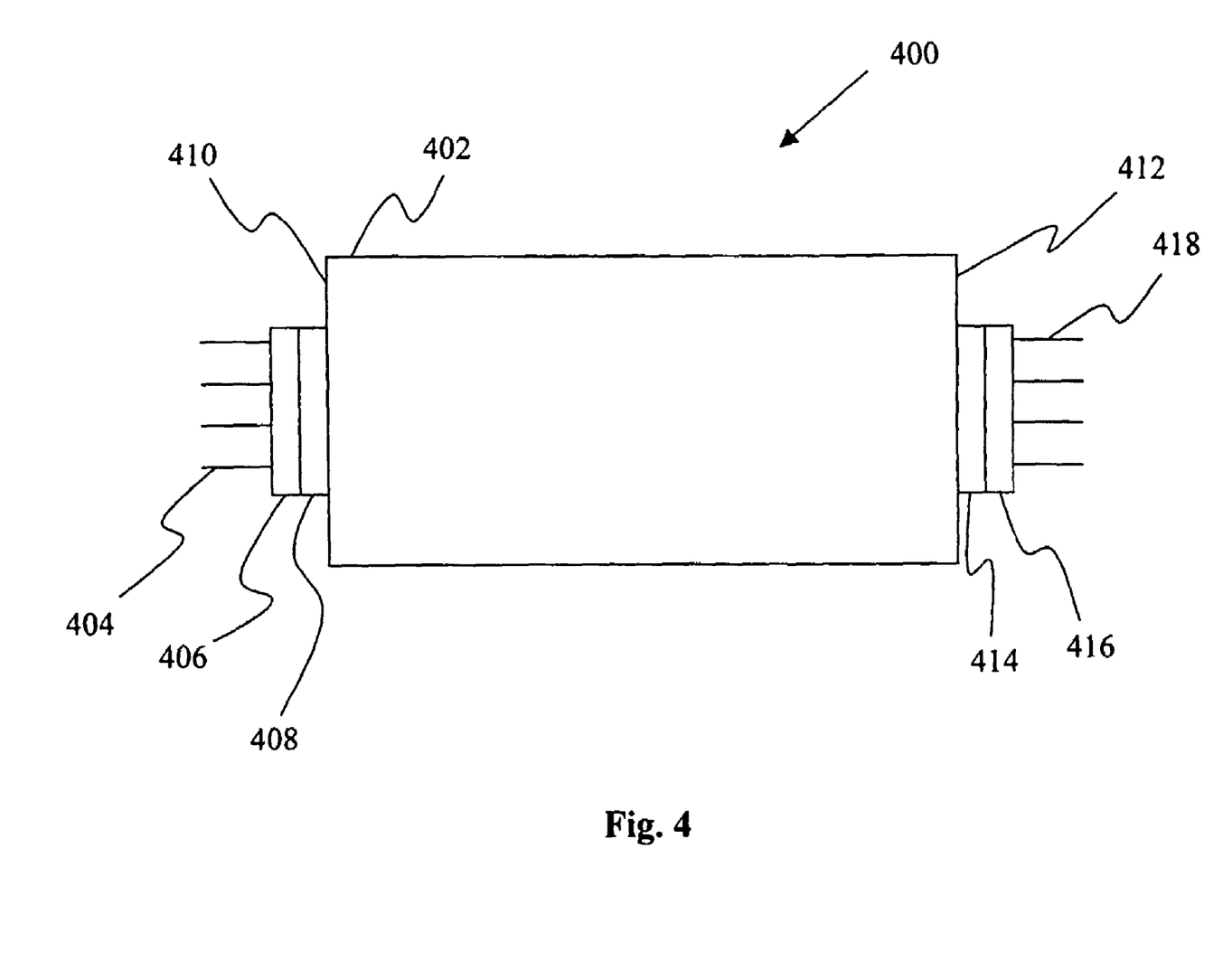
FIG. 4 shows a schematic presentation of a preferred embodiment of the optical switch in accordance with the present invention including a GRIN lens.

FIG. 4 shows a schematic presentation of a preferred embodiment of an optical switch 400 in accordance with the present invention wherein the ATO lens is a GRIN lens 402. This embodiment provides an even more compact optical switch. GRIN lens 402 is a ¼ pitch SLW 3.0 SELFOC™ lens having a length of 7.89 mm. A 4×4 SMF input fiber bundle 404, is shown on the left of FIG. 4. It has a pitch of 250 µm. A micro-lens array 406 is disposed on the input fiber bundle 404 to expand the beams to an appropriate diameter. Exemplary dimensions of this micro-lens array 406 are a diameter of 125 µm, a pitch of 250 µm, and an effective focal length of 415 µm. A first array of micro-mirrors 414 including a first common fixed mirror and a first plurality of independently 2D tiltable micro-mirrors is disposed between a micro-lens array 416 and a first end face 412 of lens 402. Exemplary dimension of the micro-mirrors 414, 408 are 125×125 µm², +/−3.4°, +/−0.2°. The first end face 412 corresponds to a first focal plane of the lens 402. A second end face 410 corresponding to a second focal plane is located on an opposed end face of lens 402. A second array of micro-mirrors 408 including a second common fixed mirror and a second plurality of independently 2D tiltable micro-mirrors is provided between a micro-lens array 406 and the second end face 410. An input fiber bundle 404 having an array of micro-lenses 406 arranged thereon is disposed at the second array of micro-mirrors 408. An output fiber bundle 418 having an array of micro-lenses 416 arranged thereon is disposed at the first array of micro-mirrors 414. The first and the second array of micro-mirrors 408 and 414 are disposed on MEMS chips. These MEMS chips are mounted in the first and second focal plane of the GRIN lens 402, for example by gluing them to the lens 402. GRIN lens 402 operates as an ATO lens and in accordance with an embodiment of the invention, a commercial GRIN lens is used and a respective beam size is computed for this lens. Micro-lenses 408, 414 are determined to determine the beam size.

However, the invention is not intended to be limited to the use GRIN lenses having a focal length approximately equal to the Rayleigh range or near zone length of a beam of light incident thereon. The array of micro-mirrors 414, the array of micro-lenses 416, and the SMF output fiber bundle have the same dimensions as the respective array of micro-mirrors 408, the array of micro-lenses 406, and the SMF output fiber bundle 404 which results in an overall dimension for optical switch 400 of 11 mm×3 mm diameter, excluding the fiber bundles; i.e. a very compact optical switch.

Using a conventional GRIN lens, such as a SELFOC™ SLW 3.0 lens, as the main optical element enables a very compact switch to be built, and further potentially eases the packaging since conventional coupler-like assembly techniques can be used. The overall footprint for a 16×16 optical switch is less than 11 mm long and 3 mm in diameter excluding the fiber bundles, standard SMF28 on 250 µm pitch.

As was explained heretofore in conjunction with the embodiments of FIGS. 2 and 3, the beams of light can be launched through the MEMS substrate directly if it is made of silicon or silica. However, for certain applications other MEMS substrates may be desired which are not transparent to the beams of light. In such a case, a passage or hole is provided on the substrate to allow the beams of light to pass through the MEMS chips.

In accordance with another embodiment of the present invention, the GRIN lens 402 is foreshortened to create room for the optical components disposed at the respective end faces of the GRIN lens 402. A foreshortening of the GRIN lens maintains the focal plane of this lens but moves the lens away from the space of the focal plane to accommodate the array of micro-mirrors.

Figure 5:
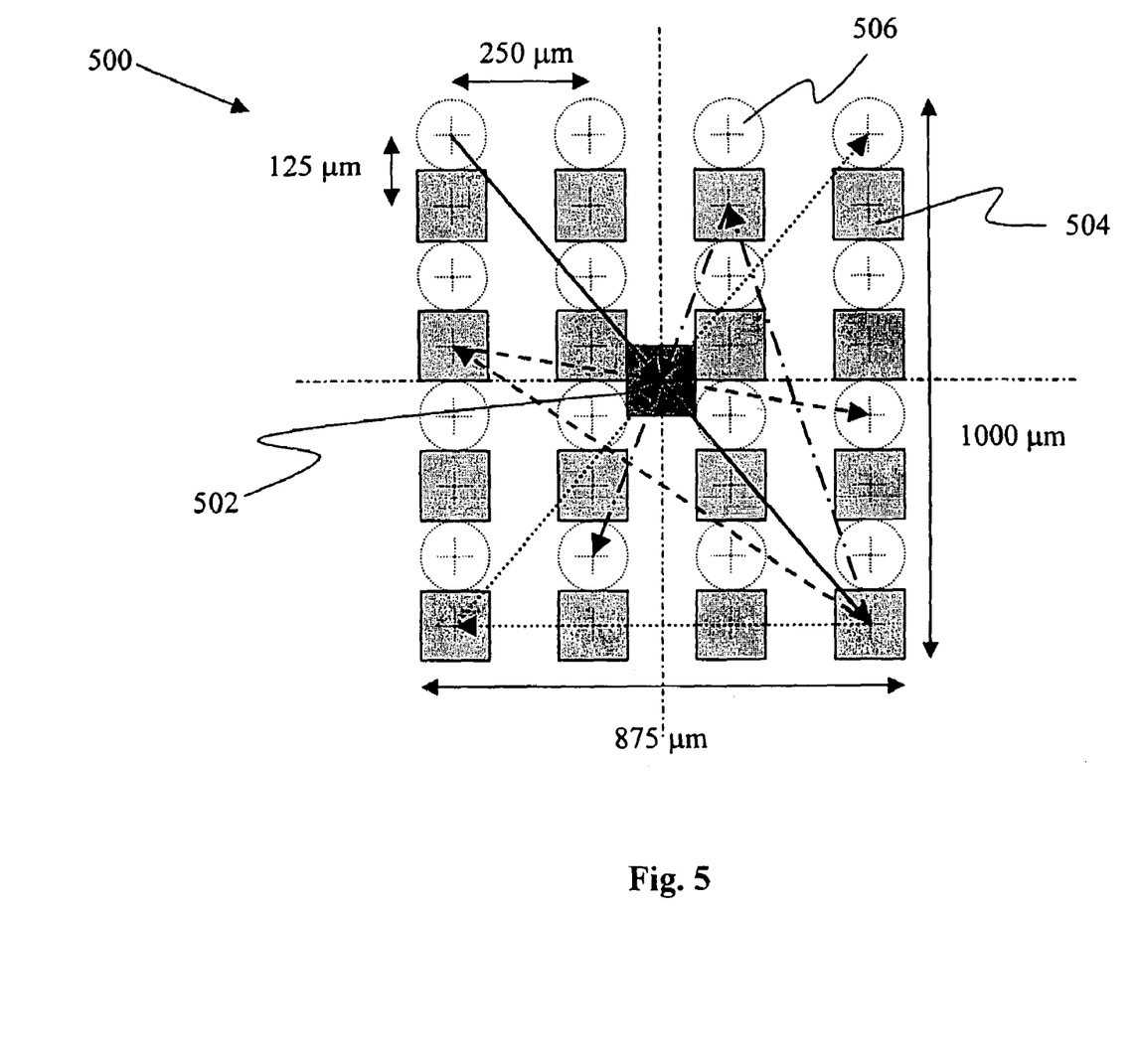
FIG. 5 shows a schematic presentation of an array of micro-mirrors provided on a MEMS chip.

FIG. 5 shows a schematic presentation of an array of micro-mirrors provided on a MEMS chip 500 as disposed on a GRIN lens for example. MEMS chip 500 is used as an example to present the first and the second array of micro-mirrors 414, 408 of FIG. 4 in more detail. A common fixed mirror 502 is shown in the center of FIG. 5. The fixed mirror 502 is surrounded by an array of 4×4 of independently 2D tiltable micro-mirrors 504 and beams of light 506 are shown in between neighboring micro-mirrors 504. Exemplary dimensions of MEMS chip 500 are presented in FIG. 5.

Figure 6A:
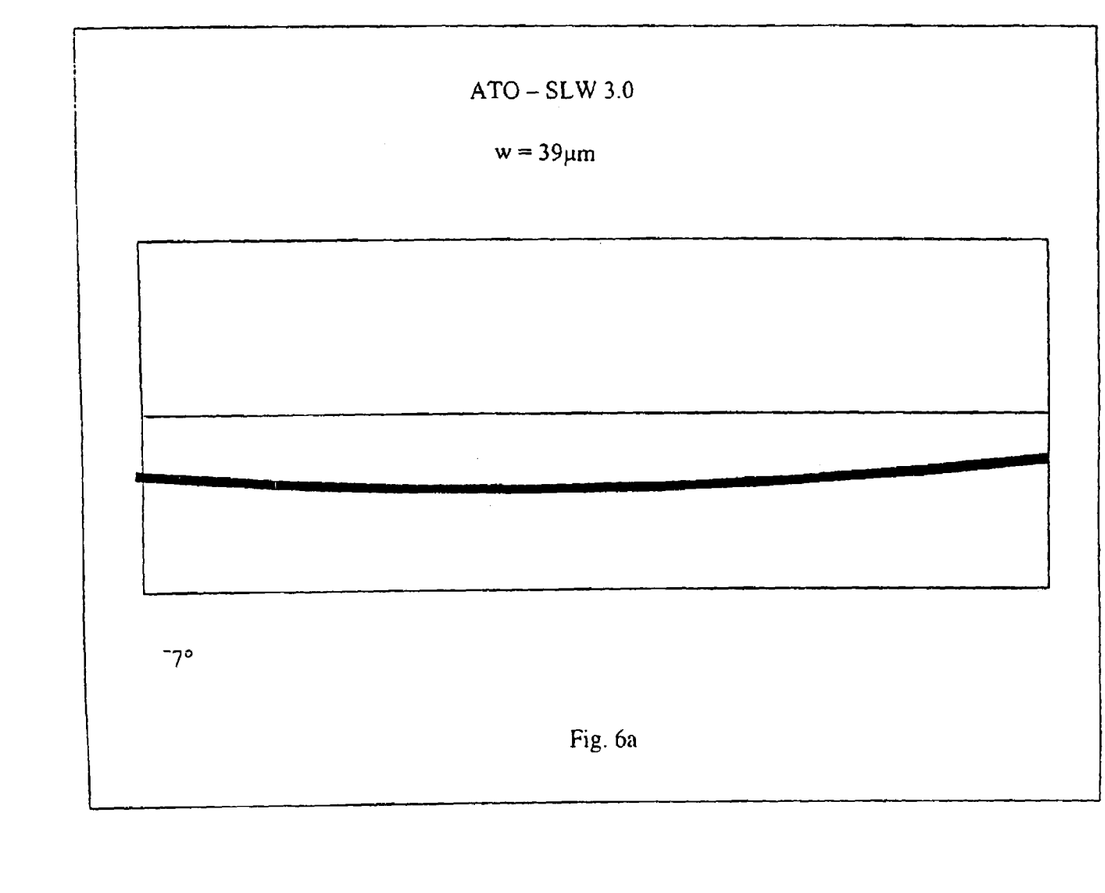
FIGS. 6a–6c show a schematic presentation of a Gaussian propagation of the beam of light through a GRIN lens when tilted by $-7°$ (FIG. 6a), $0°$ (FIG. 6b) and $+7°$ (FIG. 6c)
Figure 6B:
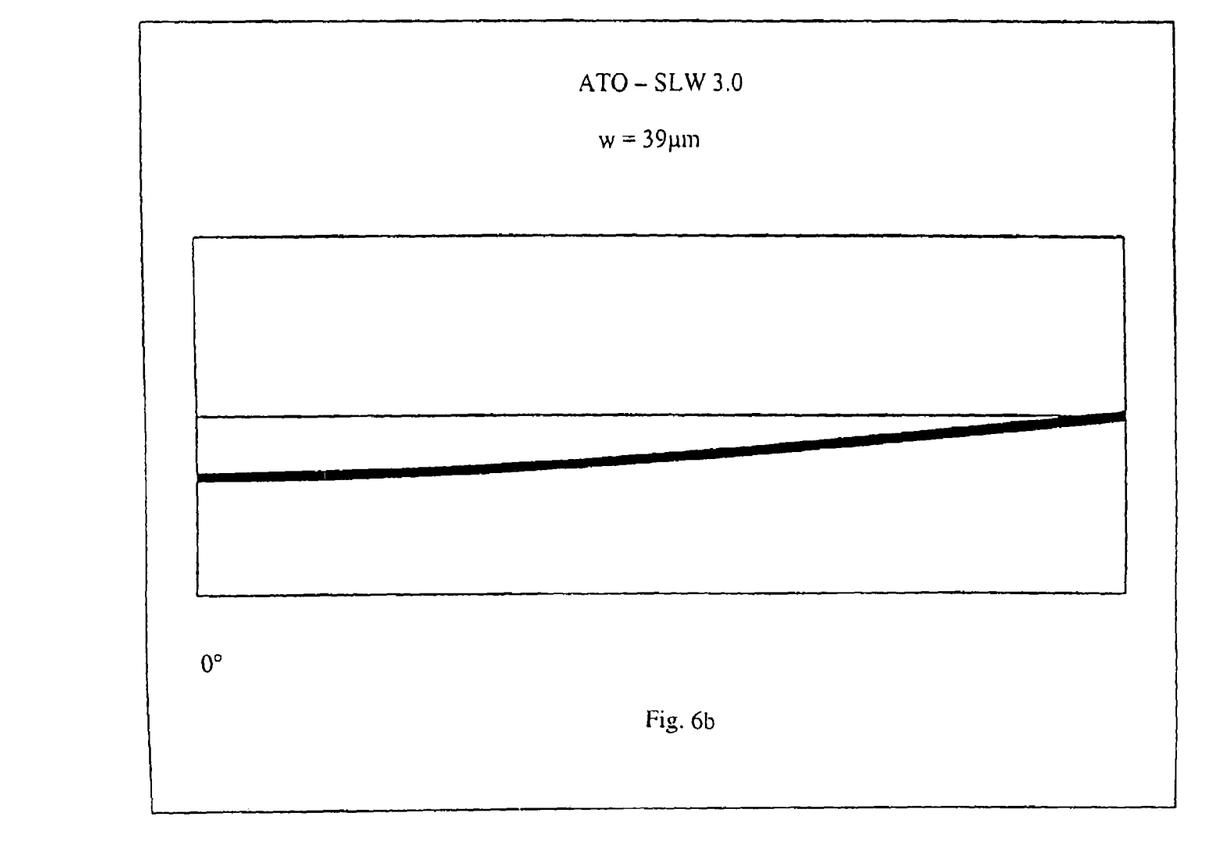
Figure 6C:
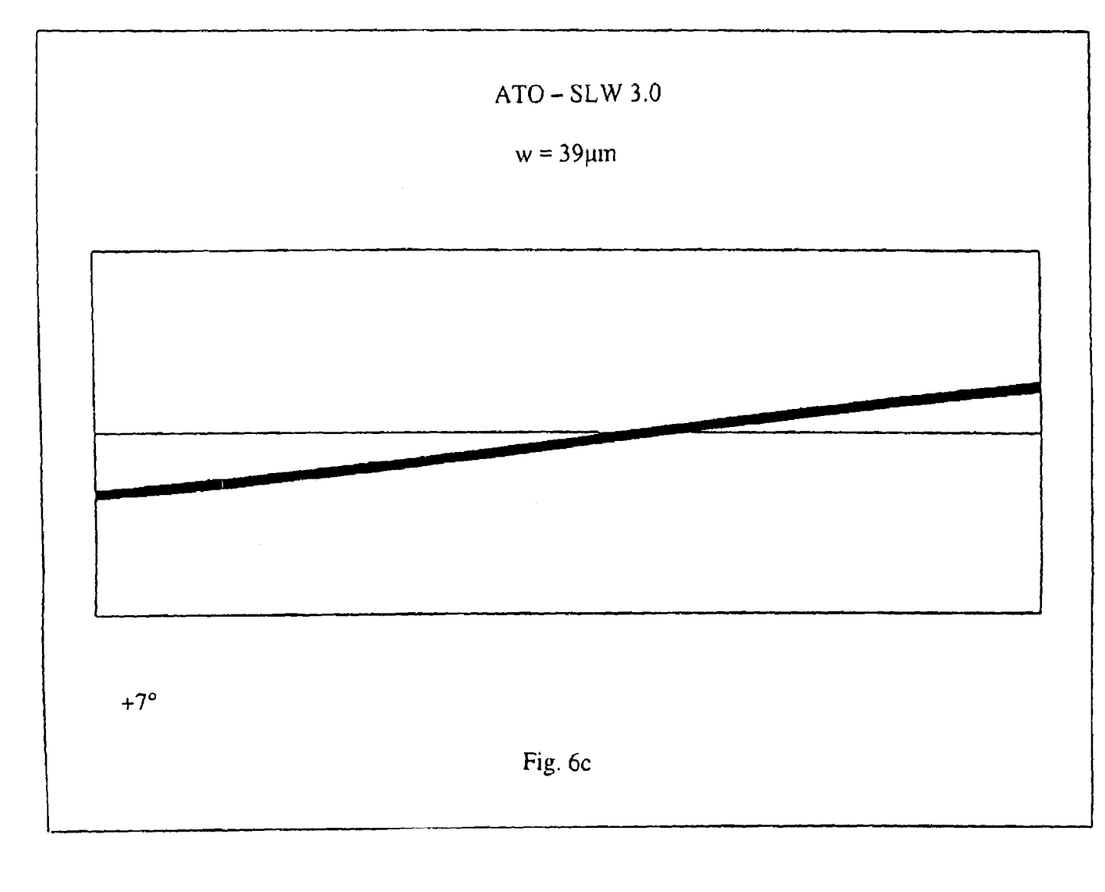

FIGS. 6a–6c show a schematic presentation of a Gaussian propagation of the beam of light through a GRIN lens when tilted by −7° (FIG. 6a), 0° (FIG. 6b) and +7° (FIG. 6c).

FIGS. 6a to 6c show that the GRIN lens is in agreement with the ATO lens principle in that a certain input mode is maintained at the output. For example, FIG. 6a shows that when a micro-mirror tilts a beam of light by −7° a negative position below the optical axis is reached at the opposed end face of the lens. If the micro-mirror tilts the beam by +7° a positive position above the optical axis is reached (FIG. 6c) and if the micro-mirror tilts the beam by 0° a position on the optical axis is reached (FIG. 6b).

Below follows a brief description of the angle-to-offset (ATO) principle as described through Gaussian beam optics. General Gaussian beam theory states that if the input waist of $1/e^2$ beam radius $W_1$ is placed at the front focal plane of a lens of focal length F then the output waist of $1/e^2$ beam radius $W_2$ is located at the back focal plane of the lens. The relationship between these radius sizes is shown in the following equation $$W_2 = \frac{F\lambda}{\pi W_1}$$

It is apparent from this equation that the input beam size can be made equal to the output beam size by selecting an appropriate focal length F. This focal length is equal to the Raleigh range or near zone length of the input beam.

Figure 7:
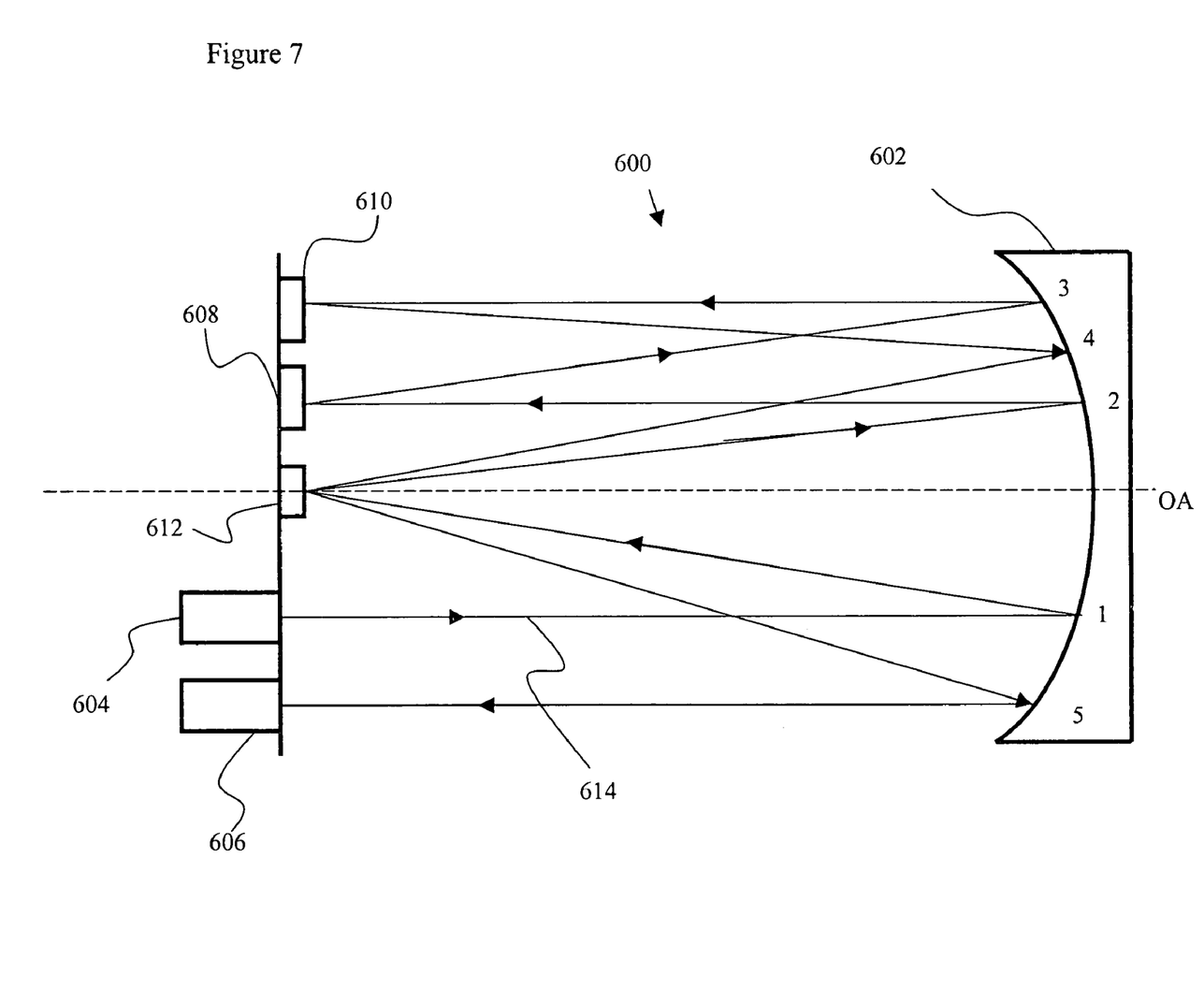
FIG. 7 illustrates a side view of a second embodiment of the present invention with a folded structure.
Figure 8:
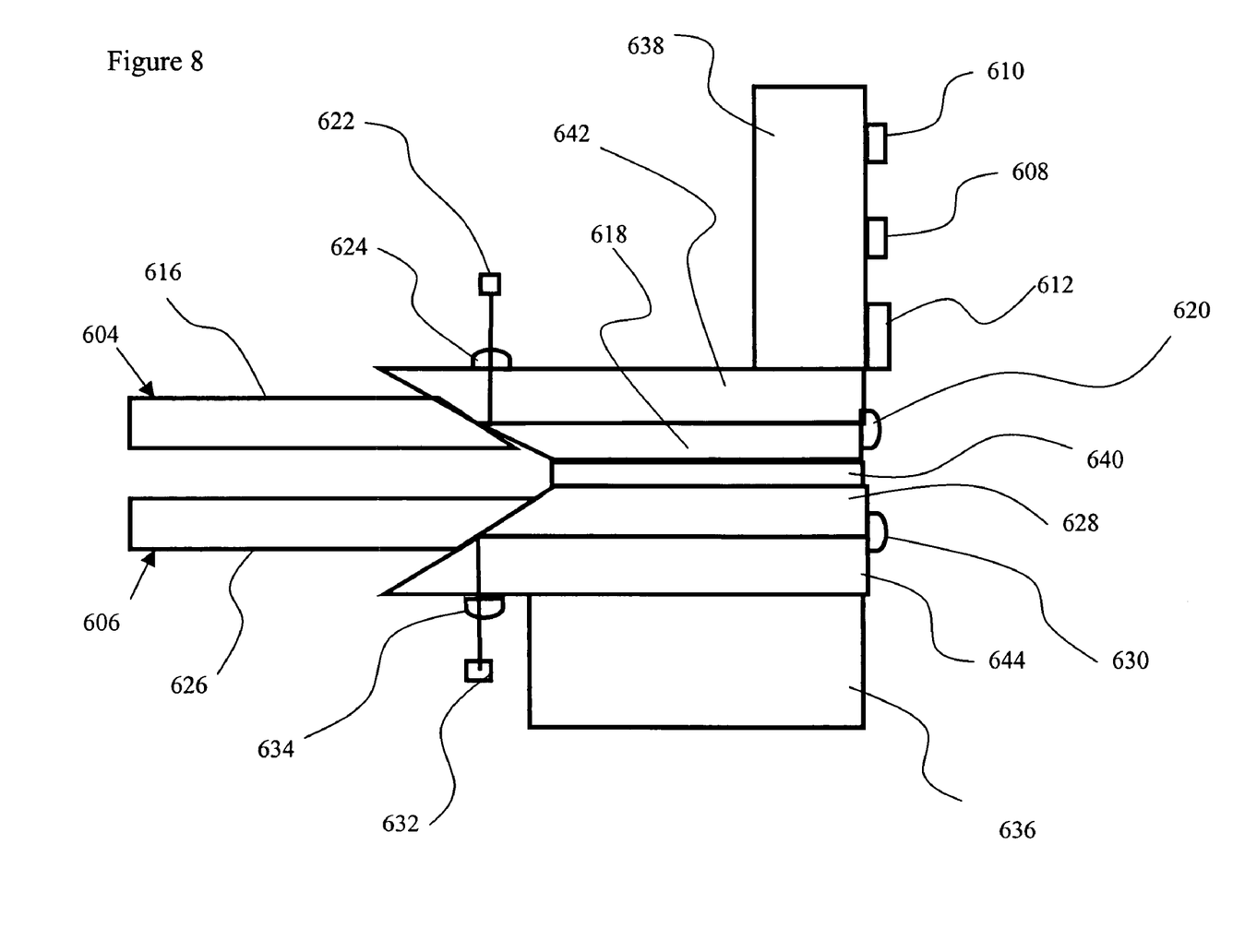
FIG. 8 illustrates a side view of the front end of the embodiment of FIG. 7.
Figure 9:
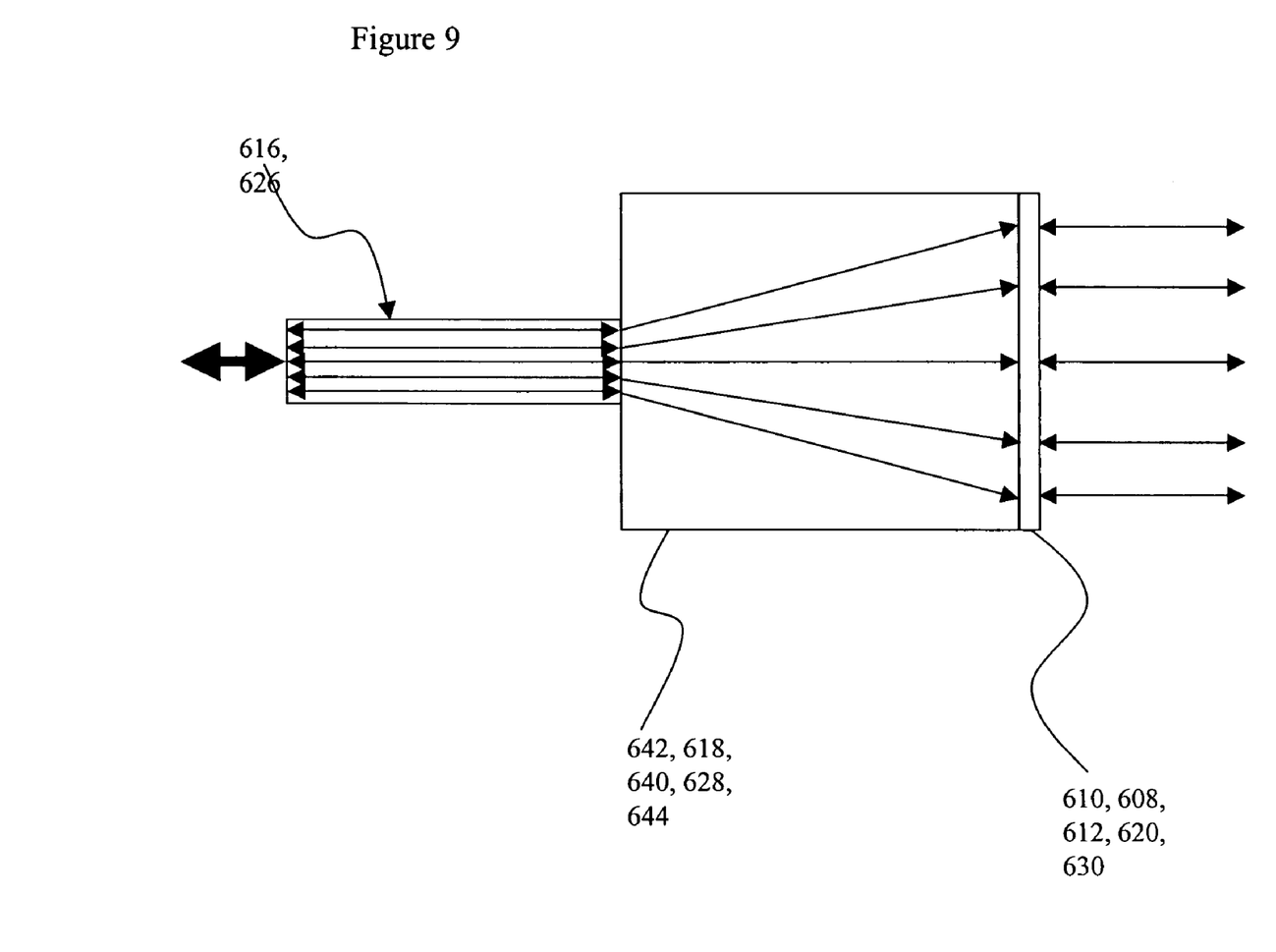
FIG. 9 illustrates a top view of the front end of the embodiment of FIGS. 7 and 8.

FIGS. 7, 8 and 9 illustrate a second embodiment of the present invention in which the switch 600 is a folded version of the aforementioned switches. A concave mirror 602 provides the ATO element, whereby an array of input ports 604, an array of output ports 606, first and second arrays of tiltable micro-mirrors 608 and 610, and a single fixed mirror 612 can be positioned on the same side on the switch 600 adjacent one another approximately one focal length away from the concave mirror 602. Preferably, the fixed mirror 612 is positioned along the optical axis OA of the concave mirror 602, with the array of input ports 604 and the first array of tiltable micro-mirrors on either side thereof, and the array of output ports 606 and the second array of tiltable micro-mirrors 610 disposed at the outer extremities.

A beam of light 614 is launched into the switch core through one of the input ports 604 at the concave mirror (ATO element) 602, and is redirected back to the fixed mirror 612, which redirects the beam 614 back to the concave mirror 602 once again. The concave mirror 602 redirects the beam 614 back to one of the tiltable mirrors in the first array of mirrors 608, which directs the beam 614 back to the concave mirror for a third time. One of the tiltable mirrors in the second array of mirrors 610 then receives the beam of light 614, and redirects it back to the fixed mirror 612, once again, via the concave mirror 602. The beam of light is then reflected off the concave mirror 602 for the fifth and last time to one of the output ports 606.

With reference to FIGS. 8 and 9, which more clearly illustrates the front end of the switch 600, the array of input ports 604 includes an input fiber array unit (FAU) 616, an input fan-out waveguide 618, and an input micro-lens array 620. The input fan-out waveguide 618 (See FIG. 9) spreads the beam paths apart, so that the periodicity of the input FAU 616 matches that of the tiltable mirrors 608 and 610. Moreover, the input fan-out waveguides 618 enable pilot beams from a VCSEL array 622 to be launched into the switch core via a micro-lens array 624 for mirror alignment testing.

Similarly, the array of output ports 606 includes an output FAU 626, an output fan-out waveguide 628, and an output micro-lens array 630. A detector array 632 is provided for receiving the pilot beams from the VCSEL array 622 via a microlens array 634.

The front end is mounted on a base 636, while the first and second arrays of micro-mirrors 608 and 610 and the fixed mirror 612 are mounted on a support 638. A waveguide spacer 640 separates the input fan-out waveguide 618 from the output fan-out waveguide 628, while a first prismatic spacer 642 separates the input fan-out waveguide 618 from the support 638, and a second prismatic spacer 644 separates the output fan-out waveguide from the base 636.

Numerous other embodiments can be envisaged without departing from the spirit and scope of the invention.

What is claimed is:

1. An optical switch comprising:
    a pair of opposed optical arrays, each optical array including a fixed mirror and a plurality of independently tiltable mirrors;
    at least one input port, disposed within one of the optical arrays, for launching a beam of light towards the fixed mirror in other optical array, which redirects the beam of light for multiple passes between the tiltable mirrors in both optical arrays to the fixed mirror in the one optical array;
    at least two output ports, disposed within the other optical array, for selectively receiving the beam of light from the fixed mirror in the one optical array; and
    an ATO element having optical power disposed between the pair of opposed optical arrays for directing the beam of light during each pass between the optical arrays.

2. The optical switch as defined in claim 1, wherein the pair of opposed optical arrays is disposed in respective focal planes of the ATO element.

3. The optical switch as defined in claim 2, wherein the ATO element has a focal length approximately equal to a near zone length or Rayleigh range of a beam of light incident thereon.

4. The optical switch as defined in claim 2, wherein the at least one input port and the at least two output ports are optical bypasses for allowing a beam of light to pass through a respective one of the pair of opposed optical arrays.

5. The optical switch as defined in claim 4, wherein the pair of opposed optical arrays, the at least one input port, the at least two output ports, and the ATO element are disposed about an optical axis of the ATO element.

6. The optical switch as defined in claim 5, wherein the fixed mirror of each of the pair of opposed optical arrays is positioned along the optical axis of the ATO element.

7. An optical switch comprising:
    a plurality of input ports for launching beams of light into the optical switch;
    a plurality of output ports for selectively receiving the beams of light from the input ports;
    an angle-to-offset(ATO) element having optical power for performing an angle-to-offset transformation, said ATO element being disposed for redirecting the beams of light traveling between the input ports and the output ports;
    a first plurality of independently tiltable deflectors and a second plurality of independently tiltable deflectors for switching the beams of light via the ATO element;
    a first fixed deflector for receiving the beams of light from each input port via the ATO element, and for deflecting each beam of light to one of the first plurality of independently tiltable deflectors via the ATO element, and a second fixed deflector for receiving each beam of light from the second plurality of independently tiltable deflectors via the ATO element, and for deflecting each beam of light to a selected output port via the ATO element.

8. The optical switch as defined in claim 7, wherein the ATO element has a focal length approximately equal to a near zone length or Rayleigh range of a beam of light incident thereon.

9. The optical switch as defined in claim 8, wherein the input ports, the output ports, the ATO element, the first plurality of deflectors, and the second plurality of deflectors are disposed about an optical axis of the ATO element.

10. The optical switch as defined in claim 9, wherein each beam of light is redirected five times by the ATO element between one of the input ports and a selected one of the output ports.

11. The optical switch as defined in claim 9, wherein the first plurality of deflectors and the second plurality of deflectors are disposed on a first MEMS chip and a second MEMS chip, respectively; and wherein the input ports and the output ports are disposed at optical bypass regions of the first and the second MEMS chip, respectively.

12. The optical switch as defined in claim 7, wherein the ATO element is one of a focusing lens, a GRIN lens, and a concave mirror.

13. The optical switch as defined in claim 7, wherein the ATO element is a concave mirror; and wherein the first and second fixed deflectors comprises a single fixed mirror.

14. The optical switch as defined in claim 13, wherein the input ports, the output ports, the first plurality of deflectors, the second plurality of deflectors, and the single fixed mirror are disposed adjacent each other remote from the concave mirror.

15. An optical switch comprising:
 a plurality of input ports for launching beams of light into the optical switch;
 a plurality of output ports for selectively receiving the beams of light from a plurality of optical paths between the input ports and the output ports;
 an angle-to-offset (ATO) element having optical power for performing an angle-to-offset transformation, said ATO element being disposed for redirecting the beams of light traveling between the input ports and the output port; and
 a first array of tilting deflectors and a second array of tilting deflectors for switching each beam of light from one of the input ports to a selected one of the output ports, and
 a fixed deflector, which receives each of the beams of light from the input ports via the ATO element for directing the beams of light to the first array of tilting deflectors, and which receives the beams of light from the second array of tilting deflectors via the ATO element for directing each beam of light to the selected output port;
 wherein each beam of light is redirected five times by the ATO element when switching between the input ports and the output ports.

16. The optical switch as defined in claim 15, wherein the ATO element comprises a concave mirror.

17. The optical switch as defined in claim 16, wherein the input ports, the output ports, the first plurality of deflectors, the second plurality of deflectors, and the fixed deflector are disposed adjacent each other in a focal plane of the concave mirror.

18. The optical switch as defined in claim 17, wherein the fixed deflector is disposed along an optical axis of the concave mirror; wherein the first plurality of deflectors and each of the input ports are disposed on opposite sides of the fixed deflector;
 wherein the second plurality of deflectors is disposed adjacent to the first plurality of deflectors; and
 wherein the output ports are disposed adjacent to each of the input ports.

* * * * *